US008960184B2

(12) United States Patent
Karni (10) Patent No.: US 8,960,184 B2
(45) Date of Patent: Feb. 24, 2015

(54) SOLAR RECEIVER SYSTEM

(75) Inventor: Jacob Karni, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 373 days.

(21) Appl. No.: 13/060,972

(22) PCT Filed: Aug. 31, 2009

(86) PCT No.: PCT/IL2009/000836
§ 371 (c)(1),
(2), (4) Date: Feb. 25, 2011

(87) PCT Pub. No.: WO2010/023672
PCT Pub. Date: Mar. 4, 2010

(65) Prior Publication Data
US 2011/0155124 A1   Jun. 30, 2011

Related U.S. Application Data

(60) Provisional application No. 61/093,325, filed on Aug. 31, 2008.

(51) Int. Cl.
*F24J 2/24* (2006.01)
*F24J 2/28* (2006.01)
*F24J 2/07* (2006.01)

(52) U.S. Cl.
CPC .... *F24J 2/28* (2013.01); *F24J 2/07* (2013.01); *Y02E 10/41* (2013.01); *Y02E 10/44* (2013.01); *Y02E 10/46* (2013.01)
USPC ............ 126/651; 126/648; 165/141; 165/155

(58) Field of Classification Search
CPC ............... F24J 2/07; F24J 2/28; F24J 2/0488; F23G 5/46; F23L 15/04; F24D 11/003; F24D 11/007; C04B 35/622
USPC ......... 126/651, 680, 681, 688, 689, 690, 691, 126/699, 698, 673, 648, 657; 165/141, 154, 165/155
See application file for complete search history.

(56) References Cited

U.S. PATENT DOCUMENTS

| 842,658 A | 1/1907 | Haskell |
| 980,505 A | 1/1911 | Emmet |

(Continued)

FOREIGN PATENT DOCUMENTS

| CN | 2236116 Y | 9/1996 |
| CN | 101122425 A | 2/2008 |

(Continued)

OTHER PUBLICATIONS

International Search Report and Written Opinion of the International Searching Authority for International Application No. PCT/IL2009/000836, dated May 7, 2010, 12 pages.

(Continued)

*Primary Examiner* — Kenneth Rinehart
*Assistant Examiner* — Bao D Nguyen
(74) *Attorney, Agent, or Firm* — Vorys, Sater, Seymour and Pease LLP; Susanne M. Hopkins; William L. Klima (57) ABSTRACT

A solar receiver is provided, comprising a receiver housing extending along a longitudinal axis, having front and rear ends; a window configured to allow radiation to pass therethrough, the window being mounted at the front end and projecting within the housing; a receiver chamber defined between the housing and the window, the receiver chamber having a working fluid inlet for ingress of working fluid to be heated therewithin, and a working fluid outlet for egress therethrough of the heated working fluid; and a solar radiation absorber configured for absorbing the radiation and heating the working fluid thereby, the absorber being located within the receiver chamber and surrounding at least a portion of the window, the solar radiation absorber being formed with channels and made of a foam material, such as a ceramic or metallic foam material, having a characteristic average pore diameter.

42 Claims, 6 Drawing Sheets

(56) References Cited

U.S. PATENT DOCUMENTS

| | | | |
|---|---|---|---|
| 1,951,403 A | 3/1934 | Goddard | |
| 2,998,005 A | 8/1961 | Johnston | |
| 3,829,285 A * | 8/1974 | Beck | 432/223 |
| 3,927,659 A | 12/1975 | Blake et al. | |
| 4,007,728 A | 2/1977 | Guba | |
| 4,018,212 A | 4/1977 | Hein et al. | |
| 4,043,318 A | 8/1977 | Pei | |
| 4,062,351 A | 12/1977 | Hastwell | |
| 4,065,593 A | 12/1977 | Peterson | |
| 4,088,120 A | 5/1978 | Anderson | |
| 4,103,675 A | 8/1978 | Bar-On et al. | |
| 4,114,685 A | 9/1978 | Schwartz et al. | |
| 4,164,123 A | 8/1979 | Smith | |
| 4,185,616 A | 1/1980 | Johnson | |
| 4,186,721 A | 2/1980 | Whitman | |
| 4,212,290 A | 7/1980 | Warnken | |
| 4,258,698 A | 3/1981 | Sales | |
| 4,280,327 A | 7/1981 | MacKay | |
| 4,291,681 A | 9/1981 | Berringer | |
| 4,318,393 A | 3/1982 | Goldstein | |
| 4,414,812 A | 11/1983 | Parry | |
| 4,485,803 A | 12/1984 | Wiener | |
| 4,491,681 A | 1/1985 | Kirpich | |
| 4,509,333 A | 4/1985 | Nussdorfer et al. | |
| 4,513,731 A | 4/1985 | Campbell | |
| 4,602,614 A | 7/1986 | Percival et al. | |
| 4,706,651 A | 11/1987 | Yudow | |
| 4,905,665 A | 3/1990 | Geyer et al. | |
| 5,245,986 A | 9/1993 | Karni | |
| 5,323,764 A | 6/1994 | Karni et al. | |
| 5,421,322 A * | 6/1995 | Karni et al. | 126/680 |
| 5,437,265 A * | 8/1995 | Yamauchi et al. | 126/657 |
| 5,448,889 A | 9/1995 | Bronicki | |
| 5,505,917 A | 4/1996 | Collier, Jr. | |
| 5,596,981 A | 1/1997 | Soucy | |
| RE35,890 E * | 9/1998 | So | 165/109.1 |
| 5,851,460 A | 12/1998 | Bauer et al. | |
| 5,931,158 A | 8/1999 | Buck | |
| 5,947,114 A | 9/1999 | Kribus et al. | |
| 5,957,194 A | 9/1999 | Azar | |
| 5,979,439 A | 11/1999 | Hoffschmidt et al. | |
| 6,099,931 A | 8/2000 | Heller et al. | |
| 6,516,794 B2 | 2/2003 | Karni et al. | |
| 6,807,963 B1 | 10/2004 | Niedermeyer | |
| 6,811,910 B2 | 11/2004 | Tsai et al. | |
| 6,926,440 B2 | 8/2005 | Litwin | |
| 6,931,851 B2 | 8/2005 | Litwin | |
| 7,011,086 B2 | 3/2006 | Litwin | |
| 7,024,857 B2 | 4/2006 | Karni et al. | |
| 7,077,532 B1 | 7/2006 | Diver et al. | |
| 7,263,992 B2 | 9/2007 | Zhang | |
| 7,690,377 B2 | 4/2010 | Goldman et al. | |
| 2002/0064610 A1 | 5/2002 | Misonou | |
| 2002/0083946 A1 * | 7/2002 | Karni et al. | 126/648 |
| 2005/0200124 A1 | 9/2005 | Kleefisch et al. | |
| 2005/0262720 A1 | 12/2005 | Rane et al. | |
| 2006/0168960 A1 | 8/2006 | Krouse | |
| 2006/0174866 A1 | 8/2006 | Zhang | |
| 2006/0260314 A1 | 11/2006 | Kincaid et al. | |
| 2007/0221208 A1 * | 9/2007 | Goldman | 126/651 |
| 2008/0146440 A1 | 6/2008 | Westin et al. | |
| 2008/0308153 A1 | 12/2008 | Grip | |
| 2009/0078959 A1 | 3/2009 | Suehiro et al. | |
| 2009/0229264 A1 | 9/2009 | Gilon et al. | |
| 2009/0241938 A1 | 10/2009 | Arbogast et al. | |
| 2009/0277442 A1 | 11/2009 | Jensen | |
| 2009/0294113 A1 | 12/2009 | Cha et al. | |
| 2010/0206298 A1 | 8/2010 | Karni | |

FOREIGN PATENT DOCUMENTS

| | | |
|---|---|---|
| DE | 90 16 385 | 2/1991 |
| DE | 197 40 644 | 3/1999 |
| EP | 0 552 732 | 7/1993 |
| EP | 1 610 073 | 12/2005 |
| EP | 1 610 073 A2 | 12/2005 |
| GB | 2188137 A | 9/1987 |
| JP | 2002350079 A | 12/2002 |
| WO | WO-97/11321 | 3/1997 |
| WO | WO-2009/027986 | 3/2009 |
| WO | WO-2010/023672 | 3/2010 |
| WO | WO-2010/092564 | 8/2010 |
| WO | WO-2010/092575 | 8/2010 |
| WO | WO-2011/024176 | 3/2011 |
| WO | WO-2011/092702 | 8/2011 |
| WO | WO-2011/092703 | 8/2011 |

OTHER PUBLICATIONS

The Notice of References for U.S. Appl. No. 12/675,517, part of paper 20130103, one page, (2013).

* cited by examiner

SOLAR RECEIVER SYSTEM

FIELD OF THE INVENTION

The present invention relates generally to solar energy systems and more particularly to solar energy systems with solar receivers.

BACKGROUND OF THE INVENTION

Turbines are commonly used to produce electrical power. Typically, a working fluid, such as air, steam or any other gas, is compressed and heated before being supplied to the turbine, wherein the working fluid is expanded and some of the energy content of hot, compressed working fluid is converted to mechanical motion which is then converted to electricity by use of a generator.

In solar energy systems one device known in the art for heating the working fluid prior to entering the turbine is a solar receiver. Such a receiver utilizes solar radiation which impinges upon a solar radiation absorber within the solar receiver. The working fluid is heated by the absorber, and thereafter the working fluid transfers the heat via the turbine for producing electrical power therefrom. Additionally, heat exchangers, chemical reactions, or any other suitable apparatus or process may be used to generate electricity from the heated working fluid.

SUMMARY OF THE INVENTION

According to one aspect of the present invention, there is provided a solar receiver comprising:
- a receiver housing extending along a longitudinal axis, having front and rear ends;
- a window configured to allow radiation to pass therethrough, the window being mounted at the front end and projecting within the housing;
- a receiver chamber defined between the housing and the window, the receiver chamber having a working fluid inlet for ingress of working fluid to be heated therewithin, and a working fluid outlet for egress therethrough of the heated working fluid; and
- a solar radiation absorber configured for absorbing the radiation and heating the working fluid thereby, the absorber being located within the receiver chamber and surrounding at least a portion of the window, the solar radiation absorber being formed with channels and made of a foam material, such as a ceramic or metallic foam material, having a characteristic average pore diameter, each of the channels:
  being open at a proximal, window-facing, end;
  extending radially within the absorber; and
  terminating at a distal end being closed by the material of the absorber. The channel thus extends only partially in the radial direction; part of the absorber is located distally to each channel.

Foams which are suitable for use as solar radiation absorbers allows solar radiation to pass therethrough, heating portions thereof which are within its thickness. Working fluid similarly enters the foam for transfer thereto of energy absorbed by the foam. The amount of energy which is absorbed by the foam, and is thus useful for heat transfer to working fluid, decreases as the radiation penetrates deeper into the foam. This can be expressed as:

$$\text{Total Absorbed Radiation} = A(1-e^{-bx})$$

where A is a constant related to system characteristics, b is the extinction coefficient, which is related to the foam structure, and x is the distance traveled through the material. In practice, the value of this equation is close to one when x is about 3 times the average pore diameter of the foam, indicating that when the radiation has penetrated to a distance equal to about three times the average pore diameter of the material, nearly the maximum amount of radiation which can be absorbed has been. Once the radiation exits the material, this effect is "reset", i.e., upon impinging upon a second piece of material, the value of x returns to zero, allowing additional absorption thereof within the second piece of material.

The solar radiation absorber may define a plurality of circumferential bands, each comprising a plurality of the channels. It may further comprise a plurality of circumferential absorber elements arranged axially, each absorber element comprising portions of one or more of the bands. The absorber elements may be formed with the channels formed in an axially-facing side thereof, all of the channels disposed within a single band being open toward a single axial direction. Each of the elements may comprise two of the bands, the channels of each of the bands being open toward an opposite axial direction than the channels of the other of the bands. The channels in each of the bands may be disposed axially adjacent to portions of material of the absorber between the channels of the other band. The absorber elements may be arranged such that channels thereof are disposed axially adjacent to portions of material of the absorber between the channels of an adjacent absorber element. Portions of material of the absorber between the channels of each of the bands may circumferentially overlap portions of material of the absorber between the channels of the other of the bands.

Portions of material of the absorber between the channels may constitute a wave-shaped window-facing profile.

The axial thickness of each of the sections of the material of the absorber bounding the channels may be greater than three times or five times the average pore diameter.

The material of the absorber closing the distal end of each channel may have a thickness, in the radial direction, greater than three times or five times the average pore diameter.

The channels may have a shape in a cross-section of a plane which is perpendicular to the radial direction, being substantially rectangular. The shape may comprise rounded corners.

The circumferential length of each channel may be smaller than that of the portion of material of the absorber circumferentially adjacent thereto.

The radial length of each channel may be larger than that of the material of the absorber closing the distal end thereof.

The solar receiver may further comprise a radiation shield disposed between the working fluid inlet and the receiver chamber. The radiation shield may be configured to allow working fluid to flow therethrough.

The solar receiver may be designed to facilitate working fluid to flow from the working fluid inlet around and along the window prior to flowing into the absorber.

According to another aspect of the present invention, there is provided a solar receiver system comprising:
- a solar receiver as described above; and
- a turbine operative to receive the working fluid from the working outlet and to generate electricity therefrom.

According to a further aspect of the present invention, there is provided a solar radiation absorber for use in a solar receiver, the solar radiation absorber being configured for absorbing radiation and heating a working fluid thereby, the solar radiation absorber being formed with channels and made of a foam material having a characteristic average pore diameter, each of the channels:

being open at a proximal, radiation-facing, end;
extending radially within the absorber; and
terminating at a distal end being closed by the material of the absorber.

BRIEF DESCRIPTION OF THE DRAWINGS

The present subject matter will be understood and appreciated more fully from the following detailed description, taken in conjunction with the drawings in which.

DETAILED DESCRIPTION

In the following description, various aspects of the present subject matter will be described. For purposes of explanation, specific configurations and details are set forth in order to provide a thorough understanding of the present subject matter. However, it will also be apparent to one skilled in the art that the present subject matter may be practiced without the specific details presented herein. Furthermore, well known features may be omitted or simplified in order not to obscure the description of the subject matter.

Figure 1:
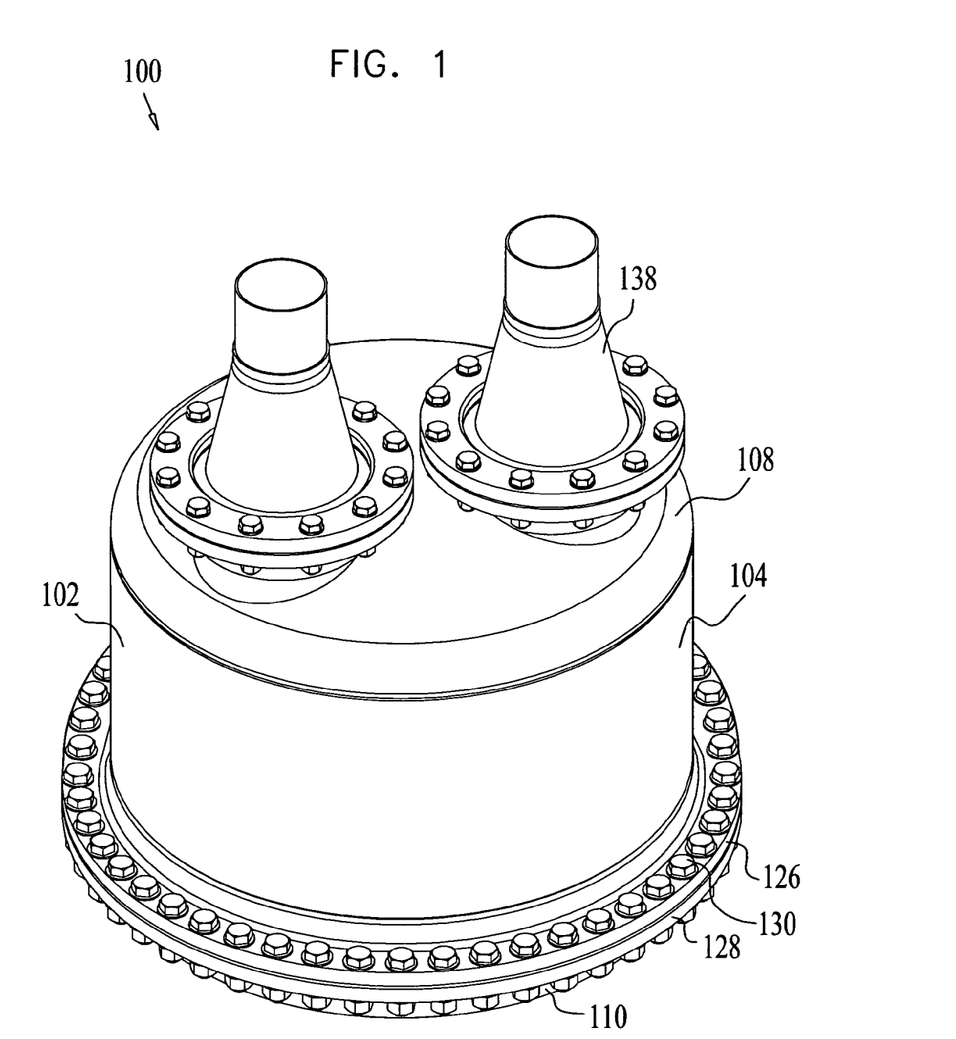
FIG. 1 is a perspective view of a solar receiver.

As seen in FIG. 1, a solar receiver 100 comprises a receiver housing 102 formed of stainless steel or any other suitable material. Housing 102 may be configured of a generally cylindrical main portion 104 having a central axis X (see FIG. 2A), and being formed with a top portion 108 at a rear end thereof, and a bottom portion 110 at a front end thereof. Housing 102 may be shaped in any suitable form.

Figure 2A:
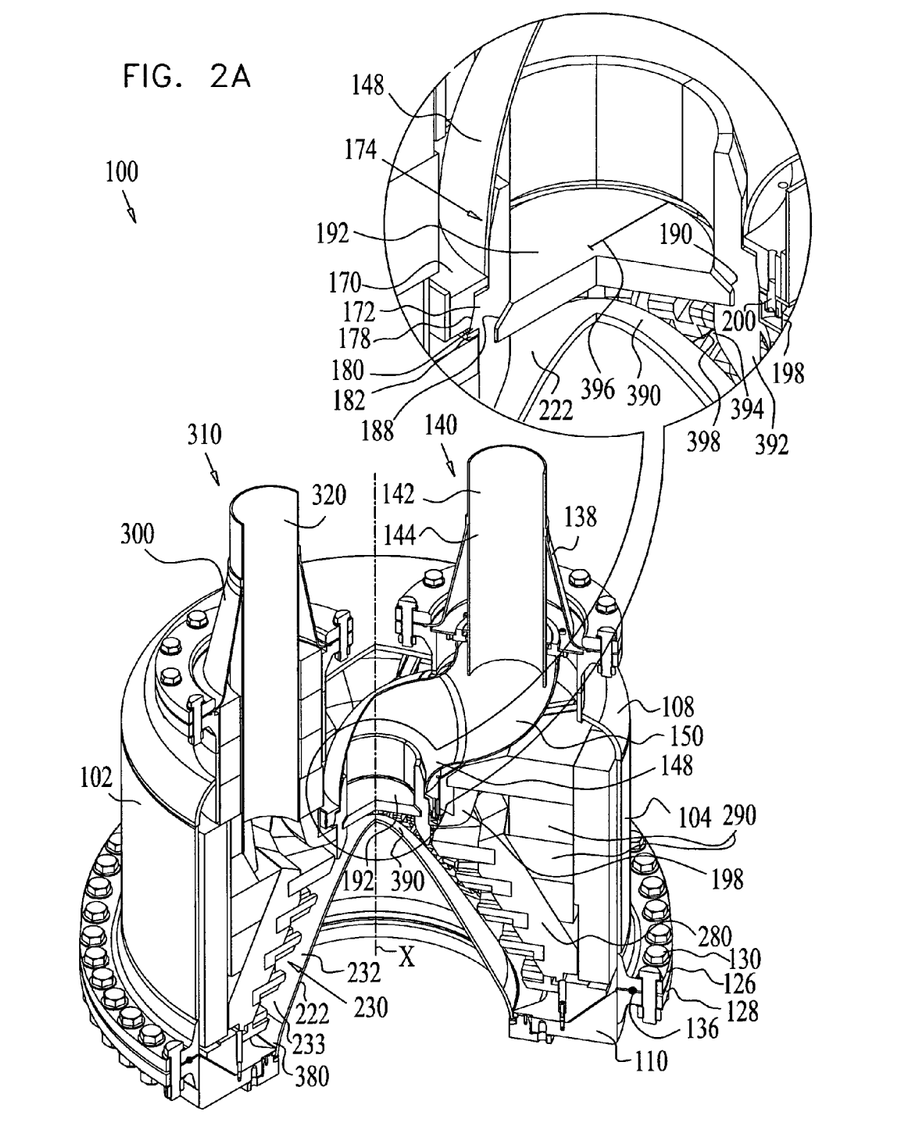
FIGS. 2A and 2B are partial sectional views of the receiver illustrated in FIG. 1.
Figure 2B:
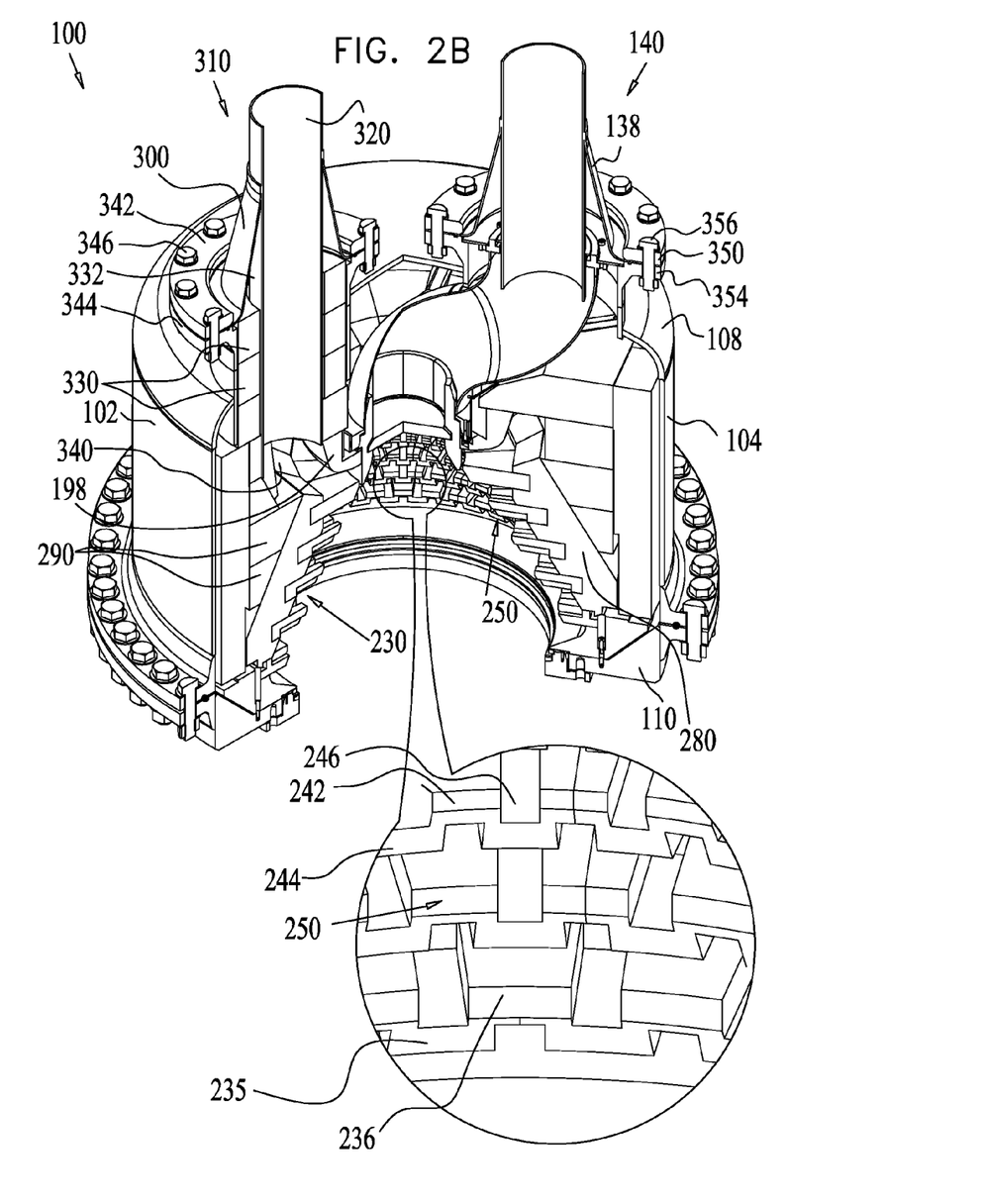

As seen in FIGS. 2A and 2B, wherein FIG. 2A illustrates the intact solar receiver 100 with a window and in FIG. 2B the window is not shown so as to illustrate elements surrounding the window, main portion 104 is engaged with top portion 108 by any suitable means, such as by welding, for example. Main portion 104 is engaged with bottom portion 110 by any suitable means, such as by a peripheral protrusion 126, protruding from main portion 104, mounted to a peripheral protrusion 128, protruding from bottom portion 110, by screws 130. An O-ring 136 may be disposed between protrusions 126 and 128. O-ring 136 is provided to ensure the engagement of respective main portion 104 with bottom portion 110 is a tight sealed engagement.

An inlet conduit housing 138 of an inlet conduit assembly 140 protrudes from top portion 108. An inlet conduit 142 is formed of a generally cylindrical portion 144 which is partially disposed within inlet conduit housing 138. A generally central inlet conduit portion 148 is disposed within main portion 104 of receiver housing 102 and is connected to cylindrical portion 144 by a generally angular portion 150. Inlet conduit 142 may be formed of stainless steel or any other suitable material.

As seen in the inset in FIG. 2A, central inlet conduit portion 148 defines on a bottom portion thereof a peripheral protrusion 170 which presses upon a central radiation shield enclosure 172 of a radiation shield assembly 174 at an inclined surface 178 thereof. Protrusion 170 may be formed of stainless steel or any other suitable material. Enclosure 172 may be provided for thermal insulation of high-temperature working fluid flowing through radiation shield assembly 174, as will be further described hereinbelow with reference to FIG. 4. Enclosure 172 may be formed of a ceramic or any other suitable material. A ridge 180, defined by enclosure 172, is seated on a peripheral ring support 182 formed of stainless steel or any other suitable material.

Enclosure 172 defines an annular recess 188 in a middle portion 190 thereof. A radiation shield 192 is seated within recess 188 and may be formed of any suitable material, such as ceramics or metals adopted to withstand relatively high temperatures. Radiation shield 192 may be formed of tubes, pins or any perforated structure, for example, so as to allow working fluid to flow therethrough.

An annular insulating element 198 may be provided to surround peripheral protrusion 170 and a portion of enclosure 172 and may be connected to peripheral protrusion 170 and ring support 182 via screws 200 inserted therein or by any other suitable means.

Radiation shield 192 may be provided so as to shield the inlet conduit assembly 140 from solar radiation entering receiver 100 via a window 222 while allowing the working fluid to flow from inlet conduit 142 via perforation in the radiation shield 192 on to window 222.

It is noted that the radiation shield 192 may be replaced by any other suitable means for shielding the inlet conduit assembly 140 from solar radiation.

Window 222 is mounted at the front end of the housing 102, and is disposed so as to project therewithin. Window 222 is designed so as to allow solar radiation to impinge thereon and penetrate therethrough, as will be further described hereinbelow with reference to FIG. 4.

A receiver chamber 233 is defined between the window 222 and the housing 102. The termination of the inlet conduit 142 constitutes a working fluid inlet of the receiver chamber 233, and an outlet conduit 320 (described below) constitutes a working fluid outlet of the receiver chamber 233.

Window 222 may be shaped, e.g., as a portion of a paraboloid of revolution, as a portion of a hyperbolic paraboloid, or as any suitable geometric configuration defining a streamlined contour wherein there is no profile transition from one geometric shape to the other. The streamlined contour minimizes turbulent flow of the working fluid flowing along the window 222 and minimizes reflection losses of incoming solar radiation therethrough. Additionally, the streamlined contour minimizes tensile stresses on the window 222 caused, e.g., by profile transitions, and allows for increased accuracy in production thereof.

It is noted that window 222 may be shaped in any suitable conical-like or frusto-conical-like configuration or a geometric configuration defining a streamlined contour wherein there is a profile transition from one geometric shape to the other or any other suitable form so as to allow solar radiation to impinge thereupon and working fluid to flow therearound. Window 222 may be formed of any suitable material able to withstand relatively high temperatures and admit solar radiation therein. For example, window 222 may be formed of fused quartz.

Window 222 may be mounted to housing 102 by any suitable means.

A solar radiation absorber 230 is disposed around and along at least a portion of an internal surface 232 of window 222. The solar radiation absorber 230 may be formed of any suitable material allowing solar radiation and a working fluid to pass therethrough. For example, absorber 230 may be formed of a perforated material thereby defining perforations 234 (see FIG. 3A) therein. The perforated material may be any suitable material, such a metallic or ceramic foam material comprising a network of ceramic strings defining pores therebetween. Such a material is operative to withstand relatively high temperatures, for example.

Figure 3A:
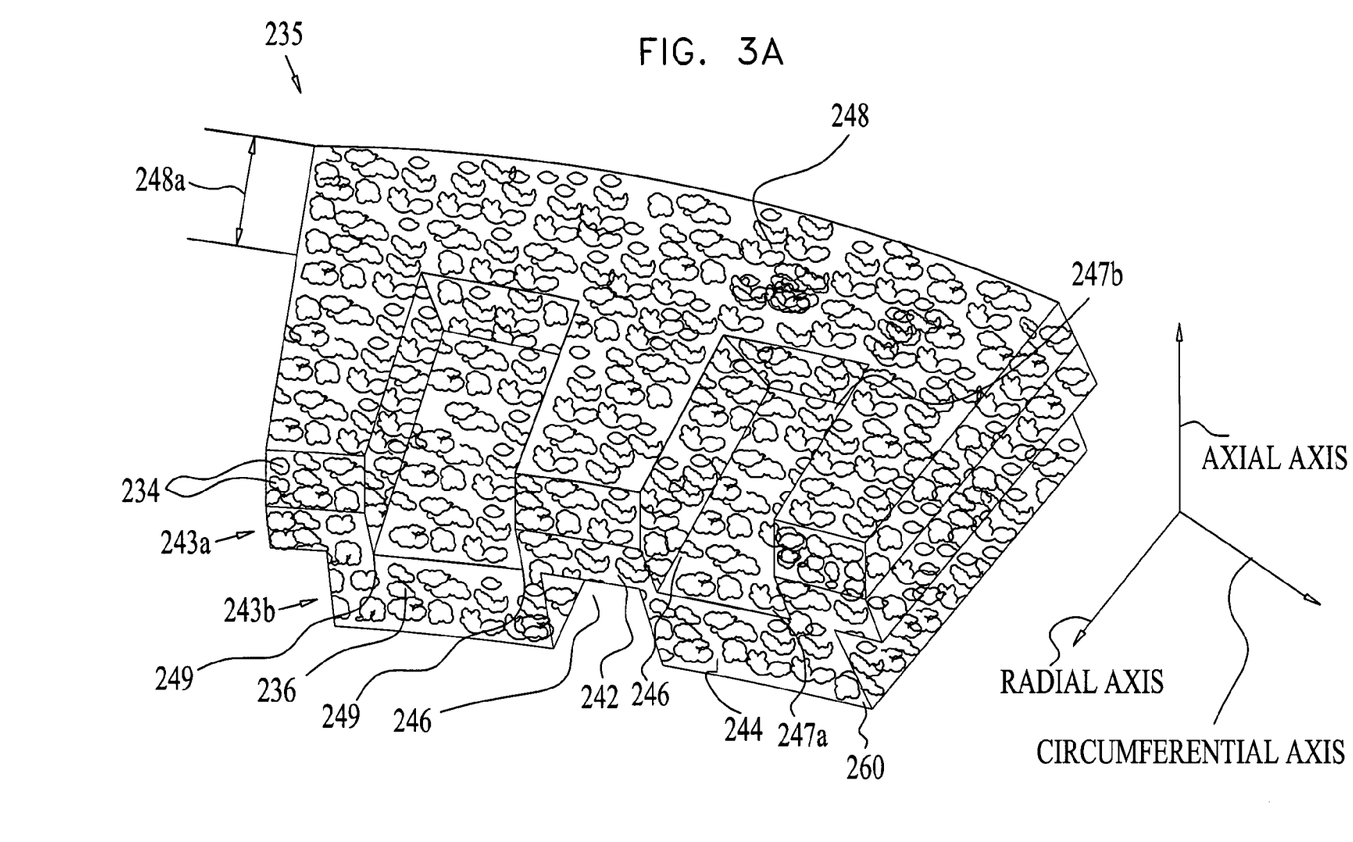
FIG. 3A is a perspective view of an absorber element of a solar absorber for use with the solar receiver illustrated in FIGS. 1 through 2B.

Solar radiation absorber 230 may comprise a plurality of solar radiation absorber elements 235, which are axially arranged to constitute the solar radiation absorber 230. Solar radiation absorber elements 235 are formed with projections 236, as seen in FIG. 3A, which is not shown to scale. Projections 236 are preferably formed with upper projections 242 in an upper circumferential band 243a, and lower projections 244 in a lower circumferential band 243b The axial and/or circumferential thickness of each of the upper and lower projections 242, 244, may be at least three or five time the average pore diameter of the ceramic foam which constitutes the absorber. Alternatively, the thickness may be related or equal to the thickness of foam which is necessary to absorb at least 95%, or even at least 99%, of incident solar radiation.

Upper projections 242 may be staggeringly arranged to circumferentially overlap axial lower projections 244 thus defining channels 246 formed between adjacent upper projections 242 and between adjacent lower projections 244. This arrangement results in the channels 246 of each of the bands 243a, 243b being adjacent to, in an axial direction, projections 242, 244 of the other band.

The channels 246 are open at a proximal (window-facing) end 247a thereof and are open in the axial direction. They extend radially toward a distal end 247b thereof, terminated by closing material 248 of the absorber 230. The radial thickness, indicated at 248a, may be equal in length to three times the average pore diameter of the ceramic foam which constitutes the absorber. In a more particular example, the radial thickness 248a may be equal in length to five times the average pore diameter of the ceramic foam which constitutes the absorber. Alternatively, the thickness may be related or equal to the thickness of foam which is necessary to absorb at least 95% of incident solar radiation. The radial length of the channel 246 may be longer than the radial thickness 248a of the closing material 248.

As seen in FIG. 3A, the channels 246 have a cross-sectional shape (when viewed in a plane which is perpendicular to the radial direction, i.e., an axial-circumferential plane) which is substantially rectangular. Corners 249 of the shape may be right-angular or rounded.

Absorber elements 235 are arranged circumferentially so as to form an annular array 250 surrounding window 222. Alternatively, the absorber element 235 may be formed as a complete annular array, e.g., formed as a complete circle or loop.

The solar radiation absorber elements 235 comprises an array of annular disk-shaped solar radiation absorber elements configured to accommodate the conical-shaped window 222, as shown in FIG. 2A. An inner diameter of the annular disk-shaped solar radiation absorber elements 235 of the array decrease with increasing penetration distance into the receiver housing to accommodate a conical shape of the conical-shaped window 222.

The array of annular disk-shaped solar radiation absorber elements 235 are connected to a support element 280. The support element 280 is a conical-shaped supporting element connected to and surrounding the array of annular disk-shaped solar radiation absorber elements 235. Further, outer edges of the annular disk-shaped solar radiation absorber elements 235 are embedded within the support element 280, as shown in FIG. 2A.

At least one side of each annular disk-shaped solar radiation absorber element 235 is provided with a plurality of outwardly extending radial projections 242, 244 defining one or more outwardly extending radial channels 246, as shown in FIGS. 2B and 3A. Alternatively, both sides of each annular disk-shaped solar radiation absorber element 235 is provided with a plurality of outwardly extending radial projections 242, 244 defining one or more outwardly extending radial channels 246, as shown in FIGS. 2B and 3A.

In the embodiment shown in FIGS. 2B and 3A, the channels 246 located on one side of the annular disk-shaped solar radiation absorber 235 is offset by angle relative to the channels located on an opposite side of the annular disk-shaped solar radiation absorber 235.

As shown in detail in FIGS. 2B and 3A, the solar radiation absorber plate element 235 comprises a plurality of spaced apart radial projections 242 located on at least one side of the solar radiation absorber plate element 235 defining a plurality of radial channels 246 located between the spaced apart radial protrusions 242. The solar radiation absorber plate element 235, as shown in FIG. 3A, is configured so that the radial channels 246 comprise inner open ends (i.e. located adjacent the window 222 (FIG. 2A) configured to receive the solar radiation and closed outer ends (FIG. 3A) located within the solar radiation absorber plate element 235 (i.e. the inner ends of the radial channels 246 are opened and the outer ends of the radial channels 246 are closed). Further, the radial channels 246 extend only a portion of the width (along radial axis) of the solar radiation absorber plate element 235 shown in FIG. 3A to provide closed outer ends of the radial channels ending within the solar radiation absorber plate element 235 (i.e. the radial channels 246 do not extend along the entire width (along radial axis) of the solar radiation plate element 235.

Figure 3B:
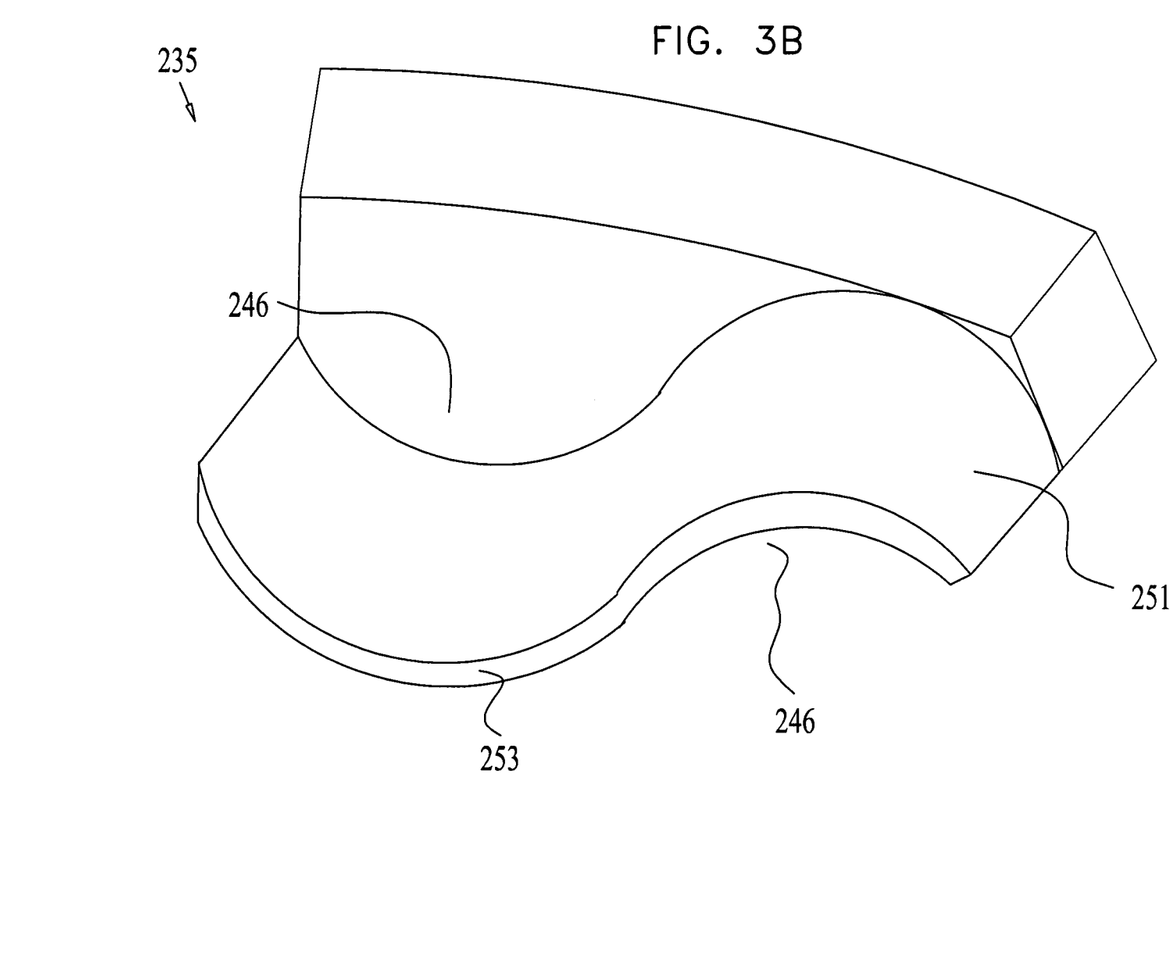
FIG. 3B is a perspective view of another example of an absorber element of a solar absorber for use with the solar receiver illustrated in FIGS. 1 through 2B.

As illustrated in FIG. 3B, the absorber elements 235 may be formed with a projection 251 having a wave-shaped window-facing profile 253, defining channels 246 which face alternating axial directions. It will be appreciated that, as described above, the absorber element 235 may be formed as a complete annular array, and the solar radiation absorber 230 may be formed as a monolithic element comprising a plurality of similar projections, each having a wave-shaped window-facing profile 253, arranged axially.

A plurality of arrays 250 are arranged axially, thus forming the solar radiation absorber 230. The arrays may be arranged such that channels 246 of one array are disposed axially adjacent to projections 242, 244 (when the absorber elements 235 are in accordance with FIG. 3A) or crests of the waves (when the absorber elements are in accordance with FIG. 3B) of an axially adjacent array.

The channels 246 allow for incoming solar radiation which had penetrated some of the material of the absorber 230, e.g., through an upper or lower projection 242, 244 to exit the material of the absorber and impinge upon and penetrate a different portion of the solar radiation absorber 230. As the amount of radiation which is absorbed decreases with the depth of penetration, as noted above, this exiting and re-penetration allows the radiation to be absorbed by a different portion of the solar radiation absorber 230. Additionally, channels 246 allow for incoming solar radiation, which had penetrated at a proximal (window-facing) end 260 of a lower circumferential band 243b, to penetrate the distal end 247b of an adjacent upper circumferential band 243a, thereby increasing the area of the projections 236 available for absorbing radiation.

It is noted that though in the embodiment illustrated in FIGS. 2A, 2B, 3A and 3B the absorber elements 235 are formed with perforations 234, the perforations 234 are only shown in FIG. 3A so as not to obscure the illustrations of FIGS. 2A, 2B and 3B.

The channels 246 and perforations 234 define together an absorber fluid channel operative to allow working fluid to flow therethrough.

Absorber elements 235 may be embedded within an insulating support element 280 formed of any suitable insulating material.

A plurality of annular thermal insulating elements 290 may be disposed within receiver 100. Thermal insulating elements 290 may be formed of a ceramic material or any other suitable material and are provided to prevent solar radiation emission into housing 102. It is appreciated that thermal insulating elements 290 may be configured in any suitable manner, such as in the form of a single element, for example.

An outlet conduit housing 300 of an outlet conduit assembly 310 protrudes from top portion 108. An outlet conduit 320 is formed of a generally cylindrical portion which is partially disposed within outlet conduit housing 300 and partially disposed within top portion 108. Outlet conduit housing 300 and outlet conduit 320 may be formed of stainless steel or any other suitable material. Outlet conduit assembly 310 is provided for egress of a working fluid from receiver 100.

A plurality of thermal insulating elements 330 may be disposed around and along an outer surface 332 of outlet conduit 320 and are provided to prevent heating of receiver housing top portion 108 by relatively high temperature working fluid flowing through outlet conduit 320. Thermal insulating elements 330 may be formed of a ceramic material or any other suitable material. Outlet conduit 320 is in fluid communication with an outlet fluid chamber 340 defined by the vicinity formed between insulating element 198, absorber 230 and insulating elements 290.

Outlet conduit housing 300 may include a first flange 340 protruding therefrom. First flange 340 may be mounted to a second flange 344 protruding from top portion 108 via screws 346 inserted therein. First flange 340 is provided as an interface with a solar energy system component, such as a turbine (not shown).

Inlet conduit housing 138 may include a first flange 350 protruding therefrom. First flange 350 may be mounted to a second flange 354 protruding from top portion 108 via screws 356 inserted therein. First flange 350 is provided as an interface with a solar energy system component, such as a compressor (not shown).

It is noted that first flanges 340, 350 of the outlet and inlet conduit housings 300, 138 may be replaced with any other suitable element or elements for providing an interface with the solar energy system component.

Figure 4:
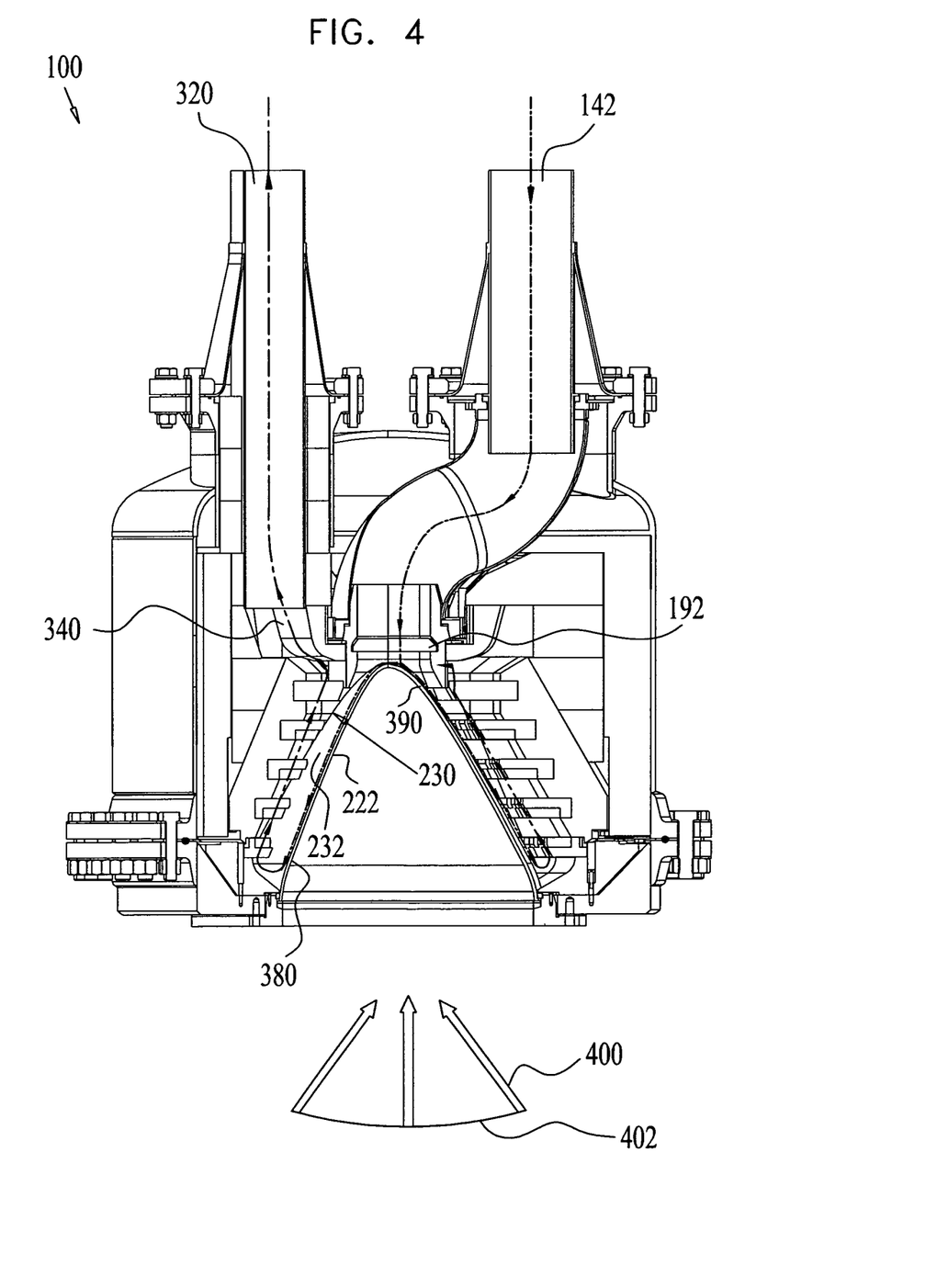
FIG. 4 schematically illustrates the operation of the solar receiver illustrated in FIGS. 1 through 2B.

As seen in FIG. 4, a working fluid, such as air, for example, is introduced into inlet conduit 142 of receiver 100. Working fluid may flow in following compression within a compressor (not shown).

Working fluid flows from inlet conduit 142 via radiation shield 192 on to the internal surface 232 of window 222. At a base portion 380 of window 222 the working fluid expands into absorber 230.

It is noted that the incoming working fluid from inlet conduit 142 flows via radiation shield 192 initially to the internal surface 232 of window 222 prior to flowing into the absorber 230 due to the decrease of the surface area of the working fluid flow from the radiation shield 192 to a top portion 390 of window 222. As seen in the inset in FIG. 2A, the surface area of the radiation shield 192 is substantially larger than the surface area defined by the area between a bottom portion 392 of enclosure 172 and top portion 390 of window 222. This area is designated by reference numeral 394. The difference in the surface areas is illustrated by the difference in a radius 396 of the radiation shield surface area and a radius 398 of surface area 394. Thus, as the surface area of the working fluid flow decreases from the radiation shield surface area to surface area 394 the velocity of the working fluid consequentially increases, thereby urging the working fluid to flow along window 222 from top portion 390 to base portion 380 thereof. At base portion 380 the velocity of the working fluid decreases thus allowing the working fluid to expend into absorber 230. The initial flow of the working fluid along window 222 provides for cooling of the window 222 subjected to relatively high temperatures due to admission of solar radiation therethrough.

Solar radiation, designated by reference numeral 400, is admitted into absorber 230 via window 222 typically following concentration by a concentrator 402 of the solar energy system. It is noted that concentrator 402 is not shown to scale.

Solar radiation 400 passes window 222 and thereafter readily penetrates some of the material of the absorber 230, e.g., through an upper or lower projection 242, 244 to exit the material of the absorber and impinge upon and penetrate a different portion of the solar radiation absorber 230. As the amount of radiation which is absorbed decreases with the depth of penetration, as noted above, this exiting and re-penetration allows the radiation to be absorbed by a different portion of the solar radiation absorber 230. Additionally, solar radiation 400 penetrates projections 236 via perforations 234.

Furthermore, incoming solar radiation, which had penetrated at proximal end 260 of a lower circumferential band 243$b$, penetrates projections 236 to distal end 247$b$ of upper circumferential band 243$a$, thereby allowing the radiation to be absorbed by substantial portions of projections 236.

The solar radiation absorbed within projections 236 is emitted as heat to working fluid flowing within the absorber 230 thereby heating the working fluid therein.

Heated working fluid flows from absorber 230 to outlet fluid chamber 340 and exits receiver 100 via outlet conduit 320. Thereafter heated working fluid may be introduced into a turbine (not shown) for generation of electrical energy therefrom.

It is appreciated that the solar receiver 100 may be incorporated in solar thermal systems such as on-axis tracking solar thermal systems, or off-axis tracking solar thermal systems. The on-axis tracking solar system is known in the art as a solar system wherein the target, e.g., a solar receiver, is always kept on a center-line formed between a solar reflector (or reflectors) and the sun, therefore the target location continuously changes to follow the sun movement. Examples of on-axis tracking solar systems include parabolic dish reflectors/concentrators and Fresnel lens concentrators. In off-axis tracking solar systems the target (e.g., solar receiver) may be stationary or move, but generally not kept in the center-line formed between the reflector (or reflectors) and the sun. Examples of off-axis tracking solar systems include central solar receivers such as solar towers.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

The invention claimed is:

1. A solar receiver, comprising:
   a receiver housing extending along a longitudinal axis, and having front and rear ends;
   a window configured to allow solar radiation to pass through said window, said window being mounted at said front end of said receiver housing and projecting within said receiver housing;
   a receiver chamber defined between said receiver housing and said window, said receiver chamber having a working fluid inlet for ingress of working fluid to be heated into the receiver chamber, and a working fluid outlet for egress of the heated working fluid from the receiver chamber; and
   a solar radiation absorber configured for absorbing said solar radiation and heating said working fluid, said solar radiation absorber being located within said receiver chamber and surrounding at least a portion of said window, said solar radiation absorber comprising:
   an insulating support element, and
   one or more solar radiation absorber elements supported by said insulating support element and extending from said insulating support element towards said window, said one or more solar radiation absorber elements being made of a foam material having a characteristic average pore diameter, said one or more solar radiation elements each having one or more channels, and each of said one or more channels:
   being located in an outer surface of said one or more solar radiation absorber elements;
   having a depth and width defined by sidewalls and a bottom wall in said one or more solar radiation absorber elements, said depth partially traversing a thickness of said one or more solar radiation absorber elements;
   being open at a proximal, window-facing, end;
   extending radially within each of said one or more solar radiation absorber elements from the proximal, window-facing, end; and
   terminating within each of said one or more solar radiation absorber elements with a distal end being closed by said material of the absorber.

2. The solar receiver according to claim 1, wherein said one or more solar radiation absorber elements each comprise one or more upper projections located in an upper circumferential band and one or more lower projections located in a lower circumferential band.

3. The solar receiver according to claim 2, wherein said one or more upper projections are staggeringly arranged relative to said lower projections.

4. The solar receiver according to claim 3, wherein said one or more solar radiation absorber elements are formed with said one or more channels formed in a particular axially-facing side of each of said one or more solar radiation absorber elements, and said one or more channels disposed within each particular band opening towards a single axial direction.

5. The solar receiver according to claim 4, wherein said one or more channels of each of said bands open towards opposite axial directions.

6. The solar receiver according to claim 5, wherein said one or more channels in a particular band are disposed axially adjacent to portions of material of said one or more solar absorber elements located between said one or more channels of said band located on an opposite side of said one or more solar absorber elements.

7. The solar receiver according to claim 5, wherein said one or more solar radiation absorber elements are arranged such that said one or more channels of said one solar radiation absorber elements are disposed axially adjacent to portions of material located between said one or more channels of an adjacent said one or more solar radiation absorber elements.

8. The solar receiver according to claim 5, wherein portions of material of said solar radiation absorber located between said one or more channels of each of said bands circumferentially overlaps portions of material of said solar radiation absorber between said one more channels of the other of said two bands.

9. The solar receiver according to claim 1, wherein portions of material of said one or more solar radiation absorber elements located between said one or more channels comprises a wave-shaped window-facing profile.

10. The solar receiver according to claim 1, wherein an axial thickness of each of a section of the material of said solar radiation absorber bounding said one or more channels is greater than three times said average pore diameter.

11. The solar receiver according to claim 1, wherein an axial thickness of each of a section of the material of said solar radiation absorber bounding said one or more channels is greater than five times said average pore diameter.

12. The solar receiver according to claim 1, wherein the material of said solar radiation absorber closing said distal end of each of said one more channels has a thickness, in a radial direction, greater than three times said average pore diameter.

13. The solar receiver according to claim 1, wherein said material of said solar radiation absorber closing the distal end of each said one or more channels has a thickness, in a radial direction, greater than five times said average pore diameter.

14. The solar receiver according to claim 1, wherein said one or more channels have a shape in a cross-section of a plane which is perpendicular to a radial direction, being substantially rectangular.

15. The solar receiver according to claim 1, wherein a circumferential length of each of said one or more channels is smaller than that of a portion of material of said absorber circumferentially adjacent thereto.

16. The solar receiver according to claim 1, wherein a radial length of each said one or more channels is larger than that of the material of solar radiation absorber closing said distal end thereof.

17. The solar receiver according to claim 1, being designed to facilitate working fluid to flow from said working fluid inlet around and along said window prior to flowing into said solar radiation absorber.

18. The solar receiver according to claim 1, wherein said foam material is selected from the group comprising a ceramic foam material and a metallic foam material.

19. A solar receiver system, comprising: a solar receiver according to claim 1, and a turbine operative to receive said working fluid from said working outlet and to generate electricity therefrom.

20. The solar receiver according to claim 1, wherein said one or more channels each having a rectangular cross-section provided into an outer surface of each respective said one or more solar radiation absorber elements.

21. The solar receiver according to claim 1, wherein said one or more solar radiation elements are one or more solar radiation plate elements comprising a plurality of radial projections on at least one side of said one or more solar radiation elements defining sidewalls of said one or more channels.

22. The solar receiver according to claim 1, wherein said one or more solar radiation elements are one or more annular-shaped solar radiation elements extending into a flow pathway defined between said working fluid inlet and said working fluid outlet, whereby the working fluid passes through said one or more solar radiation elements.

23. The solar receiver according to claim 1, wherein said window comprises a conical shape configuration.

24. The solar receiver according to claim 1, wherein said window comprises a frusto-conical configuration.

25. The solar receiver according to claim 1, wherein each solar radiation absorber element comprises spaced apart protrusions extending upwardly from said bottom wall of said one or more channels defining said sidewalls of said one or more channels.

26. The solar receiver according to claim 25, wherein an upper surface of each said protrusion defines a portion of said upper surface of said one or more solar radiation absorber elements.

27. The solar receiver according to claim 1, wherein each of said one or more solar radiation absorber elements comprise alternating protrusions and channels defining an entire closed outer surface on one side of said solar radiation absorber element.

28. The solar receiver according to claim 1, wherein said one or more solar radiation absorber elements are annular plates.

29. A solar radiation absorber for use in a solar receiver, said solar radiation absorber being configured for absorbing radiation and heating a working fluid thereby, said solar radiation absorber comprising:
  an insulating support element; and
  a plurality of solar radiation absorber elements supported by said insulating support element, said solar radiation absorber elements being made of a foam material having a characteristic average pore diameter, each of said plurality of solar radiation absorber elements comprising projections on both sides of each solar radiation absorber element defining outwardly extending radial one or more channels provided in an outer surface of each respective said solar radiation absorber element, each of said one or more channels having a depth and a width defined by sidewalls of said protrusions and a bottom wall in said solar radiation absorber element, said depth partially traversing a thickness of said solar radiation absorber, each of said one or more channels comprising an open proximal window-facing end, and terminating within each solar radiation absorber element at a distal end being closed by said material of said solar radiation absorber.

30. A solar receiver, comprising:
  a receiver housing extending along a longitudinal axis, said receiver housing comprising front and rear ends;
  a window configured to allow solar radiation to pass through said window, said window being mounted at said front end and projecting within said receiver housing;
  a receiver chamber defined between said receiver housing and said window, said receiver chamber having a working fluid inlet for ingress of working fluid to be heated into said receiver chamber, and a working fluid outlet for egress of the heated working fluid from said receiver chamber; and
  a solar radiation absorber configured for absorbing said solar radiation and heating said working fluid thereby, said solar radiation absorber being located within said receiver chamber and surrounding at least a portion of said window, said solar radiation absorber comprising:
    an insulating support element, and
    a plurality of axially spaced solar radiation absorber elements supported by said insulating support element and extending from said insulating support element toward said window, said solar radiation absorber elements being made of a foam material having a characteristic average pore diameter, each solar radiation absorber element comprising a plurality of projections located on both sides of said solar radiation absorber element defining a plurality of channels provided in an outer surface of each said solar radiation absorber element, and each of said channels being open at a proximal window-facing end, and terminating within each solar radiation absorber element at a distal end being closed by said material of said solar radiation absorber element,
  wherein each said solar radiation absorber element defines a plurality of circumferential bands, each comprising a plurality of said channels,
  wherein portions of material of said solar radiation absorber element located between the channels of each of one of said bands circumferentially overlaps portions of material of said solar radiation absorber element located between said channels of an adjacent said bands; and
  wherein said channels have a depth and a width defined by sidewalls of said projections and a bottom wall in each said solar radiation absorber elements, said depth of said channels partially traversing a thickness of said solar radiation absorber elements.

31. A solar receiver, comprising:
  a receiver housing extending along a longitudinal axis, said receiver housing comprising front and rear ends;
  a window configured to allow solar radiation to pass through said window, said window being mounted at said front end and projecting within said housing;
  a receiver chamber defined between said receiver housing and said window, said receiver chamber having a working fluid inlet for ingress of working fluid to be heated into said receiver chamber, and a working fluid outlet for egress of the heated working fluid from said receiver chamber; and
  a solar radiation absorber configured for absorbing said solar radiation and heating said working fluid, said radiation absorber being located within said receiver chamber and surrounding at least a portion of said window, said solar radiation absorber comprising:
    an insulating support element; and
    a plurality of axially spaced solar radiation absorber elements supported by said insulating support element, each said solar radiation absorber elements comprising a plurality of projections defining a plurality of radial channels provided in an outer surface of both sides of each solar radiation absorber element, said solar radiation absorber elements being made of a foam material having a characteristic average pore diameter, and each of said channels comprising an open proximal window-facing end, and terminating within each solar radiation absorber element at a distal end being closed by said material of the solar radiation absorber elements,
  wherein each said solar radiation absorber element comprises one or more circumferential bands, said one or more bands being axially arranged to comprise said radiation absorber element, and wherein said channels are spaced apart in each of said one or more bands; and
  wherein said channels have a depth and a width defined by sidewalls of said projections and a bottom wall in each said solar radiation absorber elements, said depth of said channels partially traversing a thickness of said solar radiation absorber elements.

32. A solar receiver, comprising:
a receiver housing;
a window associated with said housing, said window configured to project inwardly into said receiver housing and define a receiver chamber between said receiver housing and said window, said window configured to allow solar radiation to pass through said window into said receiver chamber, said receiver chamber comprising a working fluid inlet for ingress of working fluid to be heated into said receiver chamber, and a working fluid outlet for egress of the heated working fluid from said receiver chamber; and
a solar radiation absorber located within the receiver chamber, said solar radiation absorber configured for absorbing the solar radiation and heating the working fluid flowing through said receiver chamber, said solar radiation absorber comprising:
an insulating support element; and
a plurality of solar radiation absorber elements supported by said insulating support element and axially spaced along an axis of said receiver chamber, said solar radiation absorber comprising an array of annular disk-shaped solar radiation absorber elements configured to accommodate said window, said solar radiation absorber elements comprising a plurality of channels provided in an outer surface of each said solar radiation absorber elements, said channels being open at a proximal window-facing end and terminating at a closed distal end located within the solar radiation absorber elements,
wherein said channels have a depth and a width defined by sidewalls and a bottom wall in each said solar radiation absorber elements, said depth of said channels partially traversing a thickness of said solar radiation absorber elements.

33. The solar receiver according to claim 32, wherein an inner diameter of said annular disk-shaped solar radiation absorber elements of said array decreases with increasing penetration distance into said receiver housing to accommodate a conical shape of said window.

34. The solar receiver according to claim 33, wherein said array of annular disk-shaped solar radiation absorber elements are connected at one end to said supporting element.

35. The solar receiver according to claim 34, wherein said supporting element is a conical shape supporting element connected to and surrounding said array of annular disk-shaped solar radiation absorber elements.

36. The solar receiver according to claim 35, wherein outer edges of said annular disk-shaped solar radiation absorber elements are embedded within the support element.

37. The solar receiver according to claim 32, wherein at least one side of each annular disk-shaped solar radiation absorber element is provided with a plurality of outwardly extending radial projections defining said channels.

38. The solar receiver according to claim 37, wherein both sides of each annular disk-shaped solar radiation absorber element is provided with a plurality of outwardly extending radial projections defining said channels.

39. The solar receiver according to claim 38, wherein said channels on one side of the annular disk-shaped solar radiation absorber are offset by angle relative to said channels located on an opposite side of said annular disk-shaped solar radiation absorber.

40. A solar receiver, comprising:
a receiver housing comprising a window and a receiver chamber, said window allowing solar radiation to pass through said window into said receiver chamber, said receiver chamber comprising a working fluid inlet for ingress of working fluid to be heated within said receiver chamber, and a working fluid outlet for egress of the heated working fluid from said receiver chamber; and
a solar radiation absorber located within said receiver chamber, said solar radiation absorber absorbing the solar radiation and heating the working fluid flowing through said receiver chamber, said solar radiation absorber comprising:
an insulating support element; and
a plurality of solar radiation absorber plate elements axial supported by said insulating support element and arranged along an axis of said receiver chamber, said solar radiation absorber plate elements each comprising a plurality of spaced apart radial projections located on at least one side of said solar radiation absorber plate elements defining a plurality of radial channels provided in a surface of each respective said solar radiation absorber plate elements with the channels being located between the spaced apart and defined by said radial protrusions, said solar radiation absorber plate elements being configured so that said radial channels comprise inner open ends located adjacent said window configured to receive the solar radiation and terminating at closed outer ends located within the solar radiation absorber plate elements, and
wherein said channels have a depth and a width defined by sidewalls of said projections and a bottom wall in each said solar radiation absorber elements, said depth of said channels partially traversing a thickness of said solar radiation absorber elements.

41. A solar receiver, comprising:
a receiver housing comprising a window and a receiver chamber, said window allowing solar radiation to pass through said window into said receiver chamber, said receiver chamber comprising a working fluid inlet for ingress of working fluid to be heated within said receiver chamber, and a working fluid outlet for egress of the heated working fluid from said receiver chamber; and
a solar radiation absorber located within said receiver chamber, said solar radiation absorber absorbing the solar radiation and heating the working fluid flowing through said receiver chamber, said solar radiation absorber comprising:
an insulating support element; and
a plurality of solar radiation absorber elements supported by said insulating support element and axial arranged along an axis of said receiver chamber, said solar radiation absorber plate elements each comprising a plurality of spaced apart radial projections provided in a surface of each respective solar radiation absorber plate element and provide on at least one side of said solar radiation absorber plate elements defining a plurality of radial channels located between said spaced apart radial projections, said solar radiation absorber plate elements being configured so that said radial channels comprise inner open ends located adjacent to said window configured to receive the solar radiation, said radial channels extending only a portion of a width of the solar radiation absorber plate elements to provide closed outer ends of the radial channels terminating within the solar radiation absorber plate elements, and wherein said channels have a depth and a width defined by sidewalls of said projections and a bottom wall in each said solar radiation absorber elements, said depth of said channels partially traversing a thickness of said solar radiation absorber elements.

42. The solar receiver, comprising:
a receiver housing extending along a longitudinal axis, having front and rear ends;
a window configured to allow solar radiation to pass through said window, said window being mounted at said front end and projecting within said receiver housing;
a receiver chamber defined between said receiver housing and said window, said receiver chamber having a working fluid inlet for ingress of working fluid to be heated into the receiver chamber, and a working fluid outlet for egress of the heated working fluid from the receiver chamber; and
a solar radiation absorber configured for absorbing said solar radiation and heating said working fluid, said solar radiation absorber being located within said receiver chamber and surrounding at least a portion of said window, said solar radiation absorber comprising:
an insulating support element; and
one or more solar radiation elements supported by said insulating support element and extending from said insulating support element towards said window, said one or more solar radiation absorber elements each being provided with one or more projections defining one or more channels in a surface of each respective said one or more radiation absorber elements, said one or more solar radiation absorber elements being made of a foam material having a characteristic average pore diameter, and each of said one or more channels:
being open at a proximal, window-facing, end;
extending radially within each of said one or more solar radiation absorber elements from the proximal, window-facing, end; and
terminating within each of said one or more solar radiation absorber elements with a distal end being closed by said material of the absorber,
wherein said channels and perforations of the solar radiation absorber define together an absorber fluid channel operative to allow working fluid to flow through the solar radiation absorber, and
wherein said channels have a depth and a width defined by sidewalls of said projections and a bottom wall in each said solar radiation absorber elements, said depth of said channels partially traversing a thickness of said solar radiation absorber elements.

* * * * *